United States Patent [19]

Kasenga

[11] Patent Number: 4,479,886

[45] Date of Patent: Oct. 30, 1984

[54] METHOD OF MAKING CERIUM ACTIVATED YTTRIUM ALUMINATE PHOSPHOR

[75] Inventor: Anthony F. Kasenga, Towanda, Pa.

[73] Assignee: GTE Products Corporation, Stamford, Conn.

[21] Appl. No.: 520,968

[22] Filed: Aug. 8, 1983

[51] Int. Cl.$^3$ ............................................. C09K 11/475
[52] U.S. Cl. ............................................. 252/301.4 R
[58] Field of Search ................................. 252/301.4 R

[56] References Cited

U.S. PATENT DOCUMENTS 4,070,301 1/1978 Tomiki et al. ............... 252/301.4 R
4,141,855 2/1979 Tomiki et al. ............... 252/301.4 R

*Primary Examiner*—Jack Cooper
*Attorney, Agent, or Firm*—J. Theodosopoulos

[57] ABSTRACT

The luminous efficiency of $Y_3Al_5O_{12}$:Ce phosphor can be increased by milling the phosphor to reduce its particle size, blending barium fluoride into the milled phosphor, and then reduction annealing the blend of phosphor and barium fluoride.

1 Claim, No Drawings

METHOD OF MAKING CERIUM ACTIVATED YTTRIUM ALUMINATE PHOSPHOR

This invention is concerned with cerium activated yttrium aluminate phosphor, $Y_3Al_5O_{12}$:Ce. As disclosed in U.S. Pat. Nos. 4,034,257 and 4,241,276, such phosphors are used in high pressure mercury vapor (HPMV) arc discharge lamps for color correction purposes. The phosphors convert the UV radiation from the high pressure mercury arc (primarly 2537 and 3650 angstroms) into visible radiation, primarily in the yellow region.

This invention is particularly concerned with improving the luminous efficiency of such phosphors, but without increasing the particle size. An increase in particle size is undesirable from the process standpoint of depositing the phosphor coating on the HPMV lamp envelope, whether by wet process or by electrostatic deposition.

I have found that the luminous efficiency can be increased, without increase in particle size, by milling the finished phosphor to reduce its particle size, blending barium fluoride into the milled phosphor, and then reduction annealing the blended phosphor. Reduction annealing means firing the phosphor in a reducing atmosphere at an elevated temperature but lower then the firing temperature used to make the phosphor.

The prior art, for example, U.S. Pat. Nos. 4,070,301 and 4,141,855, discloses the addition of a barium compound to a cerium activated phosphor prepared from yttria and alumina. However, the barium is added to the mixture of source materials, not to the finished phosphor as in my invention. Moreover, the barium is added to enhance the intensity of UV emission of $YAlO_3$:Ce and not, as in my invention, to increase the efficiency of converting UV radiation to visible radiation for $Y_3Al_5O_{12}$:Ce. Furthermore, FIG. 2 of U.S. Pat. No. 4,141,855 teaches that the addition of barium reduces luminous intensity of $Y_3Al_5O_{12}$:Ce.

In an example of one method of making $Y_3Al_5O_{12}$:Ce, 33.12 grams $Y_2O_3$, 39 grams $Al_2O_3$ $3H_2O$ and 0.72 grams $CeF_3$ were milled in a 230 ml ball mill with 100 ml deionized water. After milling, the blended material was removed from the mill, dried at 120° C. and then fired at 1400° C. in an open hearth gas furnace to react the source materials to make the phosphor. After cooling, the material was pulverized and second fired in a hydrogen atmosphere at 1400° C. to 1600° C. After slight mortaring and sieving through a 200 mesh screen, the Fisher subsieve particle size (FSSS) of the phosphor was determined and the plaque brightness at 2537 and 3650 excitation was measured. The FSS particle size was 3.6 microns and the normalized relative brightness at 2537 and 3650 excitation was 85.2 and 84.0 respectively.

In one example of this invention the phosphor was processed as follows. The phosphor was vibratory milled for two hours. This reduced the particle size from 3.6 microns to 2.7 microns. Three mol percent of barium fluoride was then blended in with the phosphor and the blend was then reduction annealed at 1200° C. for two hours in a 10% hydrogen/90% nitrogen atmosphere. This increased the normalized relative brightness at 2537 and 3650 excitation to 99.6 and 104.2, respectively, for respective percentage increases of 17% and 24%. The particle size was increased to 3.4 microns, which was still 0.2 microns less than the particle size of the initial phosphor. Since reduction annealing with barium fluoride increases the particle size, it is necessary to reduce the particle size (by milling, for example) of the initial phosphor prior to reduction annealing with barium fluoride.

In another example, the initial $Y_3Al_5O_{12}$:Ce phosphor had a particle size of 5.0 microns and a brightness at 3650 excitation of 216 relative units. After two hours of vibratory milling, the particle size was reduced to 3.2 microns. Ten mol percent of barium fluoride was then blended into the phosphor and it was reduction annealed at 1200° C. as in the previous example. This increased the particle size to 3.8 microns and the brightness at 3650 excitation to 290 relative units, a gain of 34%.

I claim:

1. The method of making $Y_3Al_5O_{12}$:Ce phosphor comprising the steps of forming a mixture of source materials for $Y_3Al_5O_{12}$:Ce phosphor; firing the mixture at an elevated temperature to react the source materials to form $Y_3Al_5O_{12}$:Ce phosphor; milling the phosphor to reduce the particle size thereof; blending barium fluoride into the milled phosphor; and annealing the blend of milled phosphor and barium fluoride in a reducing atmosphere at a high temperature lower than said elevated temperature, the amount of barium fluoride blended into the milled phosphor being such that the $Y_3Al_5O_{12}$:Ce phosphor so made exhibits a greater brightness at 3650 excitation than said phosphor prepared as above absent the steps of milling the phosphor, blending barium fluoride into the milled phosphor and annealing the blend in a reducing atmosphere at said high temperature.

* * * * *